G. L. KELLEY.
WOODWORKING OR ROUTING MACHINE.
APPLICATION FILED JAN. 13, 1908. RENEWED APR. 26, 1912.

1,046,075.

Patented Dec. 3, 1912.

3 SHEETS—SHEET 1.

Witnesses:
A. G. Dimond.
A. L. McGee.

Inventor
George L. Kelley
By Wilhelm, Parker & Hard
Attorneys.

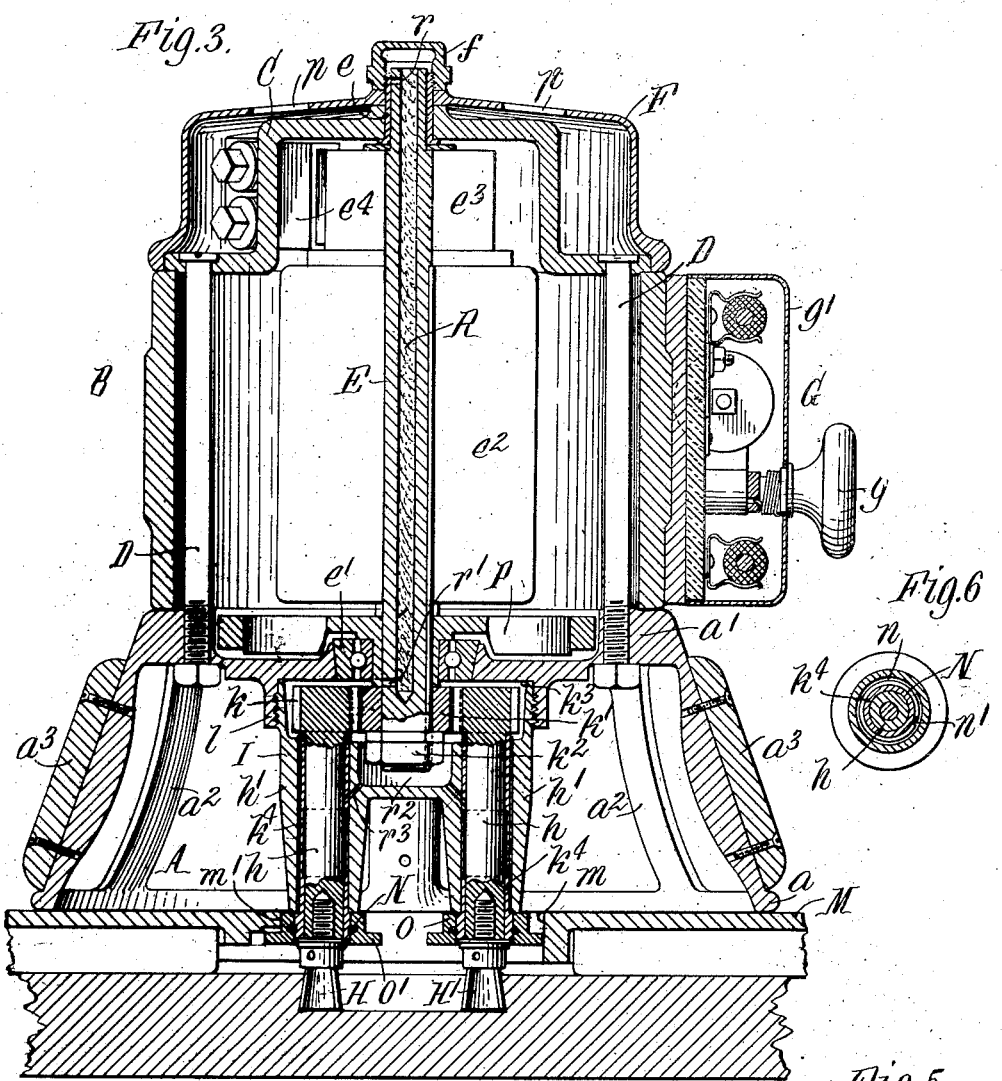

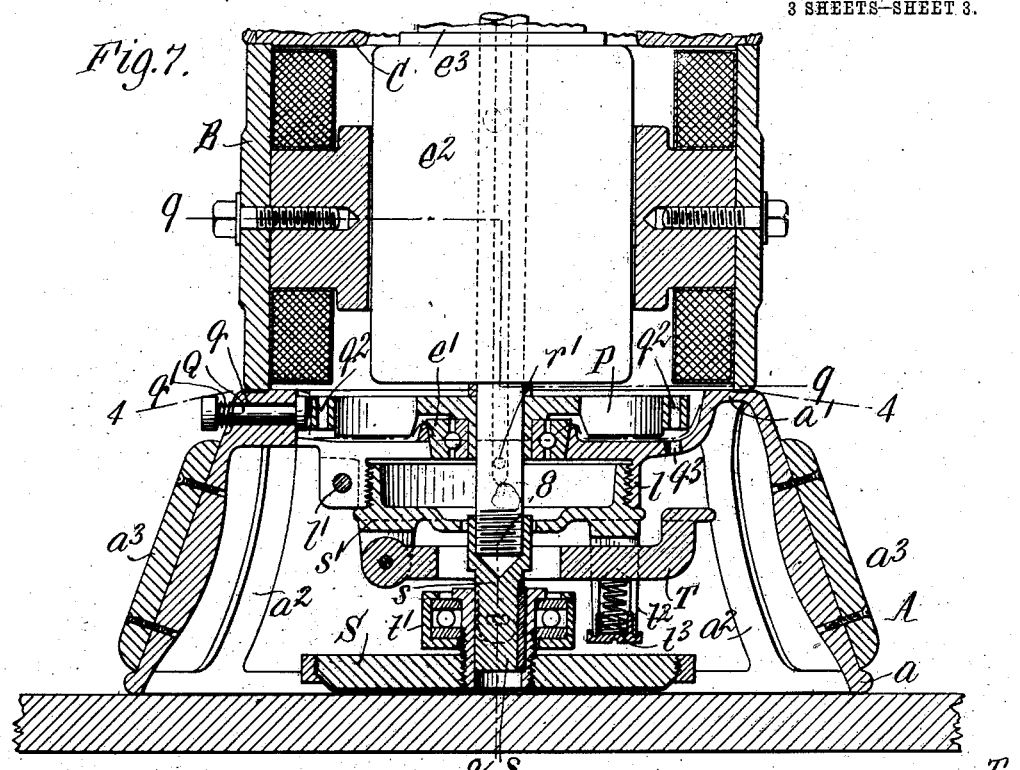

UNITED STATES PATENT OFFICE.

GEORGE L. KELLEY, OF BUFFALO, NEW YORK, ASSIGNOR, BY MESNE ASSIGNMENTS, TO KELLEY ELECTRIC MACHINE COMPANY, OF BUFFALO, NEW YORK, A CORPORATION.

WOODWORKING OR ROUTING MACHINE.

1,046,075.     Specification of Letters Patent.     Patented Dec. 3, 1912.

Application filed January 13, 1908, Serial No. 410,475. Renewed April 26, 1912. Serial No. 693,314.

*To all whom it may concern:*

Be it known that I, GEORGE L. KELLEY, a citizen of the United States, residing at Buffalo, in the county of Erie and State of New York, have invented a new and useful Improvement in Woodworking or Routing Machines, of which the following is a specification.

This invention relates more particularly to improvements in portable wood-working or routing machines of the type disclosed in my U. S. Letters Patent 877,894, dated January 28, 1908. These machines are capable of a great variety of uses, such, for example, as routing or cutting regular and irregular grooves or channels of different shapes and dimensions in the surfaces of material for different purposes. The machines can also be used for carving and for finishing the surface of material. The machine disclosed in said application comprises a casing or frame adapted to rest upon and be moved about on a guide device or pattern, two rotary cutters and a driving motor therefor mounted in said frame or casing with the cutters extending below the frame through a suitable guide opening in the pattern plate so as to enter or engage the work below the pattern. Guide rollers or parts on the machine traveling on guide edges on the pattern plate cause the cutters to follow the pattern and reproduce the same in the work, and the cutters are so related that by properly manipulating or turning the machine as it is moved over the supporting surface, regular or irregular grooves or cuts of the same width throughout or varying in width in different portions can be produced.

The objects of the present invention are to improve the mechanical construction of such a machine in the respects hereinafter described and set forth in the claims, to increase its scope of usefulness and secure a desirable, practical machine capable of rapid and efficient operation and which is readily adaptable to different uses.

Figure 1:
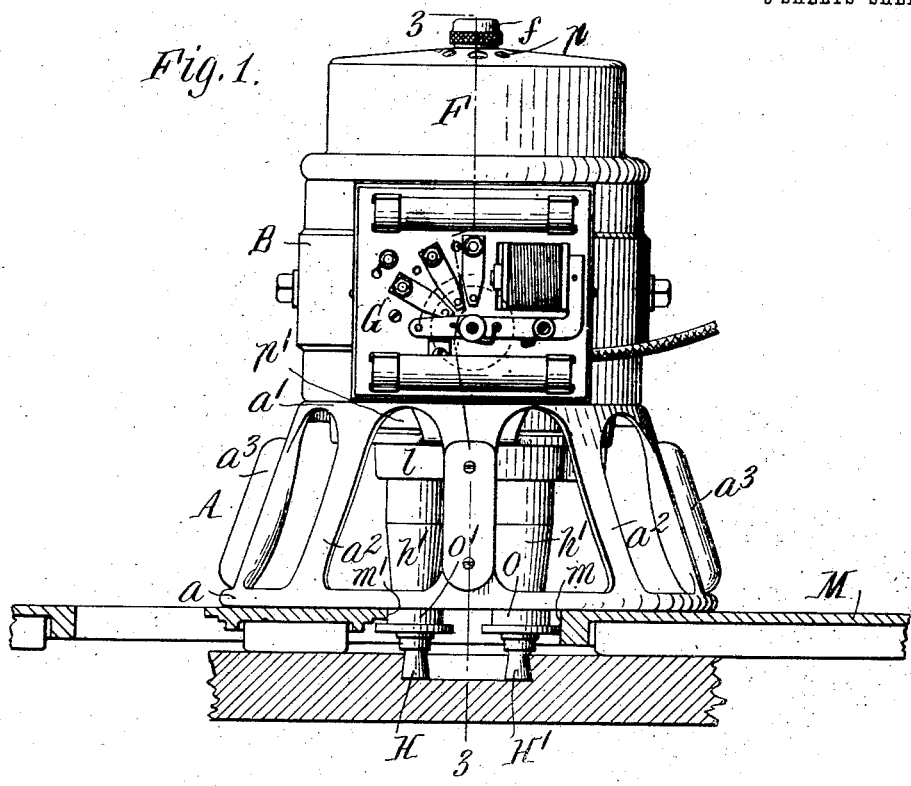
Figure 2:
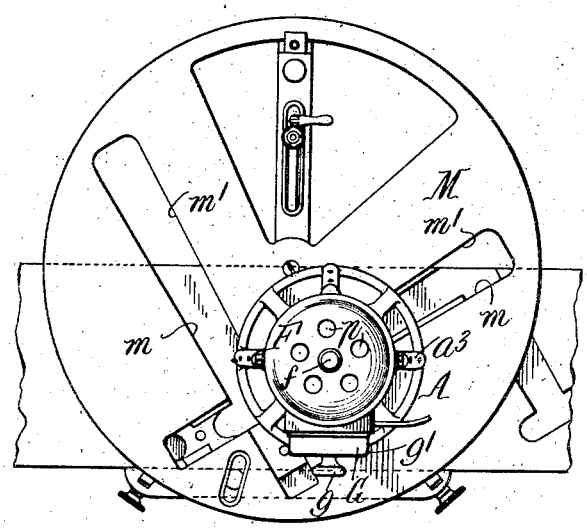

In the accompanying drawings, consisting of three sheets: Figure 1 is a front elevation of a machine embodying the invention, the cover plate for the motor controller being removed and a portion of the supporting or pattern plate for the machine and the work being shown in section. Fig. 2 is a plan view thereof, on a reduced scale. Fig. 3 is a sectional elevation thereof, on an enlarged scale, in line 3—3, Fig. 1., the cutters being shown in the same position as in Fig. 1. Fig. 4 is a fragmentary plan view, partly in section, of the top of the skirt, in line 4—4, Fig. 7. Fig. 5 is a sectional elevation of the cutters, pattern plate and work, showing one of the guide rollers for the cutters reversed. Fig. 6 is a section through one of the guide rollers, in line 6—6, Fig. 5. Fig. 7 is a fragmentary sectional elevation of the machine, the cutters being replaced by a sanding tool. Fig. 8 is a fragmentary sectional elevation of the sanding device, in line 8—8, Fig. 7. Fig. 9 is a horizontal section, partly in plan, of the machine, in line 9—9, Fig. 7.

Like letters of reference refer to like parts in the several figures.

The casing or frame in which the motor and cutters are mounted and inclosed preferably consists of a base or skirt A, a body or motor frame B, and a head or top frame C. The base or skirt is preferably of substantially bell-shape and of skeleton form, having a base ring $a$ which rests upon the supporting surface, a top $a'$, and legs $a^2$ which connect the base ring and top plate. The skirt is conveniently cast in a single piece and preferably four of the legs are rounded or convexed on their inner sides and have wooden grip pieces $a^3$ secured on their outer sides to form handles which are grasped in the hands for moving the machine about on the supporting surface. An electric motor is preferably employed and the body or motor frame B is of substantially cylindrical form and constitutes the field frame of the motor. The head or top frame consists of a bar or spider extending across the upper end of the body or motor frame. The body or field frame rests on the top plate of the skirt and the head or top frame rests on the upper end of the body or motor frame B, the three parts being connected together by vertical bolts D, Figs. 3 and 9, extending through the body or motor and through holes in the top plate of the skirt and the ends of the head or top frame.

The electrical construction of the motor constitutes no part of the invention and any suitable electric motor can be employed. The armature shaft E of the motor extends through central holes in the top frame C and top plate of the skirt A, its upper end being preferably journaled in a suitable bushing $e$ in the hole of the top frame, and its lower end in a suitable ball bearing $e'$ which, in the construction shown, consists of a circular row of balls between an inner race ring secured on the armature shaft and an outer race ring secured in the central hole in the top plate of the skirt.

$e^2$ represents the motor armature, and $e^3$ the commutator. The latter is arranged at the upper end of the armature within the top frame C, and the brush holders, which are only indicated at $e^4$ in Fig. 3, are supported by the top frame C.

F represents a removable cap which rests upon the upper end of the body or motor frame B and incloses the top frame and the motor brushes and connections to protect these parts and to prevent the operator from contact with the electrical conductors. The cap shown has a central hole through which the bushing $e$ for the armature shaft extends, and it is secured in place on the machine by a thumb nut $f$ which is screwed on the threaded upper end of the bushing. The working parts of the motor are all inclosed and protected within the casing formed by the body or motor frame B, top plate of the skirt A, and cap F.

G represents the motor controller or switch, $g$ an operating knob therefor, and $g'$, Fig. 3, a removable controller cover or casing. The cover is removed in Fig. 1.

The armature shaft of the motor extends downwardly through the top plate of the skirt for connection with the cutting tools or other tool or tools, which are arranged within the skirt in position to enter or operate upon the work. The machine, as shown in Figs. 1–6, is equipped with two rotary routing or grooving cutters H H' secured to the lower ends of upright spindles $h$ which are journaled in bearings $h'$ in a spindle case I which is removably secured to the machine frame. The cutters are preferably screwed onto the lower ends of the spindles so that they can be readily attached and detached, and gear pinions $k$ formed on or secured to the upper ends of the spindles mesh with a gear wheel $k'$ secured to the lower end of the armature shaft. The gear wheel $k'$ is preferably keyed to the armature shaft and secured thereon by a nut $k^2$ screwed on the threaded lower end of the shaft. The gear wheel and pinions are located within a chamber $k^3$ in the upper part of the spindle casing, being inclosed by the same and top of the skirt. $k^4$ represents bushings which surround the cutter spindles between the pinions and the cutters and project beyond the lower ends of the spindle bearings.

In the construction shown, the spindle case is provided with a circular screw-threaded upper portion which screws into an internally threaded circular flange $l$ depending from the top of the skirt. The top of the skirt is split radially at one side through the flange $l$ and nearly through the edge of its bearing opening, as shown in Figs. 4 and 7, and the top is provided at opposite sides of the split with depending lugs through which passes a clamping screw $l'$ for contracting the flange around the upper end of the spindle case and the bearing hole around the outer race ring of the ball bearing $e'$, to securely clamp these parts in place. By first loosening the clamping screw $l'$ the spindle case can be unscrewed and detached. The cutters being removably secured to the lower ends of the spindles can be removed therefrom and replaced by cutters or tools of different size, shape or character if desired, or the spindle case with the spindles and their pinions and cutters in place thereon can be unscrewed and removed as a unit and replaced by another spindle case or bearing part with cutters of a different size or sort or with a tool or tools of different character for performing different operations upon the work. For example, Fig. 7 shows the machine equipped with a sanding tool or device in place of the cutters H H'. The construction of the sanding device will be hereinafter described.

In using the machine with the two cutters for routing or cutting grooves, it rests upon and is moved about on a supporting or pattern plate M, and the cutters project through a suitable opening in the pattern plate or support to engage or enter the work, the cutters being caused to follow the pattern by suitable guide parts on the machine which bear against and are moved along guide faces on the pattern plate or support. Preferably the edges $m$ $m'$ of the cutter opening in the pattern plate constitute the guide faces or edges, and guide rollers O O' are journaled on the projecting lower ends of the spindle bushings $k^4$ and roll on these guide edges. The guide rollers shown are flanged at one end so that they have two guide faces of different diameters and they are reversible on the bushings, see Figs. 3 and 5. One guide edge $m'$ of the pattern plate is undercut or thin, and when the coöperating roller O' is arranged with its flange down, the flange extends under the guide edge, as shown in Fig. 3, and the smaller portion of the roller bears on the guide edge, which allows the machine to be turned to a position to increase the distance between the paths followed by the cutters and produce a wider cut than when the guide roller O' is reversed and its flange bears on the guide edge $m'$, as shown in Fig. 5. Thus by placing the guide roller O' with its flange up or down, cuts of two different widths can be made. Manifestly both guide edges of the pattern plate could be undercut or thin, in which case, by placing both guide rollers with their flanges up, or by reversing one or both rollers, cuts of three different widths can be made. To enable the ready removal and reversal of the guide rollers, spring-retaining rings N, Figs. 5 and 6, are provided in internal grooves $n$ in the guide rollers and adapted to snap into external grooves $n'$ in the projecting ends of the spindle bushings. These spring rings N retain the guide rollers on the bushings and allow them to turn thereon, but enable the guide rollers to be readily pulled off of and pushed into place on the bushing. By providing interchangeable guide rollers of different diameters, cuts of various different widths can be readily produced by means of the same cutters.

The cutters H H' shown are of relatively small diameter and must be passed over the work two or more times to completely cut out a groove of the width indicated in the drawings, but narrower grooves ranging in width from the diameter of one cutter to the combined diameters of the two cutters can be cut by a single movement of the machine over the work, by turning the machine to secure the proper relation of the cutters. By using cutters of different diameters or shapes, grooves of different widths and having differently shaped edges can be cut.

P represents a wheel which is keyed to the armature shaft E between the motor armature and the top of the skirt, and located within an annular depression or chamber in the top of the skirt and has an extended hub to which the inner race ring of the ball bearing is secured. This wheel serves the purpose of an ordinary fly wheel and its spokes are preferably shaped so that the wheel acts as a fan to cause a circulation of air downwardly through the motor and skirt to cool the motor and its armature bearings and to blow the shavings and dust caused by the cutters away from the bearings. The air enters the motor casing through holes $p$ in the cap F and passes out through holes $p'$, Figs. 1 and 4, in the top of the skirt beneath the fly wheel spokes. This fly wheel also coöperates with a brake device Q, Fig. 7, for quickly stopping the cutters when it is desired to shift the machine for a new cut. The brake device shown consists of a plunger arranged in a guide opening $q$ in the upper portion of the skirt in position for its inner end to be pressed inwardly against the periphery of the fly wheel. The brake plunger is normally held out of contact with the wheel by a suitable spring $q'$ surrounding the same between the skirt and an enlargement at the outer end of the plunger, and is preferably located just over one of the handles on the skirt where it can be pressed inwardly by the thumb of the hand grasping the handle. The fly wheel P is also preferably provided with holes $q^2$, Figs. 7 and 9, adapted to register with a hole $q^3$ in the top of the skirt. By inserting a tool through the hole $q^3$ into a hole $q^2$ of the wheel, the driven parts can be held stationary when it is desired to screw the cutters on and off.

The armature shaft is preferably provided with a cylindrical bore R, Fig. 3, which is filled with oil and wicking, and with discharge ducts $r$ $r'$ leading therefrom respectively to the upper bearing for the shaft and to a point between the lower ball bearing and drive gearing for the cutters for lubricating these parts. The spindle case has a central chamber $r^2$ into which the lower end of the armature shaft projects. The oil from the drive gearing for the cutters collects in this chamber and is fed therefrom through ducts $r^3$ to lubricate the bearings for the cutter spindles.

The sanding tool before referred to preferably comprises a sanding head S of ordinary construction, the shaft $s$ for which is screwed on the lower end of the armature shaft, and a frame or support $s'$ which is screwed into and clamped in the threaded flange $l$ on the upper portion of the skirt. The hub of the sanding head is splined to its shaft $s$ so that it turns with the shaft but can be slid up and down on the shaft out of and into contact with the work. An operating lever T for the sanding head is suitably pivoted at one end to the frame $s'$ and has a central loop through which the shaft $s$ passes and which is connected at opposite sides by suitable trunnions or the like $t$ to the outer cup or part of an antifriction thrust bearing $t'$ interposed between the lever and the hub of the sanding head. The free end of the lever extends through a suitable guide bracket $t^2$ on the support $s'$ to a position where it can be reached, and a suitable spring $t^3$ arranged in the guide bracket beneath the lever normally holds the lever up and the sanding head off of the work. By pressing downwardly on the free end of the lever the sanding head is lowered to the work. When the sanding tool is used, the machine can rest directly on the surface of the work.

The sanding tool is shown as one example of a single rotary tool with which the machine can be equipped, but it will be manifest that various other tools for different purposes can be used on the machine in place thereof.

I claim as my invention:

1. The combination of a motor, a supporting skirt therefor, said motor having an upright shaft depending into said skirt, a spindle case removably secured to said skirt and disconnected from said shaft, a tool or tools mounted in said spindle case, and drive connections between said motor shaft and said tool or tools, said spindle case being removable from the machine with said tool or tools as a unit, substantially as set forth.

2. The combination of a motor, a supporting skirt therefor, said motor having an upright shaft depending centrally into said skirt, a spindle case removably secured to said skirt and disconnected from said shaft, a plurality of spindles journaled in said spindle case and provided with tools, and intermeshing gears connecting said motor shaft and said spindles, said spindle case with the said tools and their spindles and gears being removable as a unit from said skirt whereby they can be replaced by another spindle case with a different tool or tools, substantially as set forth.

3. The combination of a motor, a supporting skirt therefor, said motor having an upright shaft depending centrally into said skirt, a stationary spindle case removably secured to said skirt, a plurality of spindles journaled in said spindle case and provided with tools, and drive connections between said motor shaft and said spindles which are removable from the skirt, whereby the spindle case tools and drive connections can be removed and a single tool connected to said motor shaft, substantially as set forth.

4. The combination of a motor, a supporting skirt therefor, said motor having an upright shaft depending into said skirt, a spindle case removably secured within said skirt and disconnected from said shaft, a plurality of upright spindles journaled in said spindle case, drive connections between said motor shaft and said spindles, and tools removably secured to the lower ends of said spindles, whereby said tools can be detached from said spindles, or said spindle case with said tools and spindles can be removed as a unit from the machine, substantially as set forth.

5. The combination of a motor, a supporting skirt therefor, said motor having an upright shaft depending centrally into said skirt, a screw-threaded part on said skirt concentric with said motor shaft, a spindle case screwed on said threaded part, and a tool or tools mounted on said spindle case and driven by said motor shaft, said tool or tools being removable with said spindle case as a unit, substantially as set forth.

6. The combination of a motor, a supporting frame therefor, said motor having an upright shaft, a spindle case which is removably secured to said frame and is rigidly held thereby in fixed position and is disconnected from said shaft, a plurality of upright spindles journaled in said spindle case which provides rigid bearings for the spindles, separable drive connections between said motor shaft and said spindles, and tools secured to the lower ends of said spindles, said spindle case with said tools being removable as a unit from said machine whereby the same can be replaced by another spindle case with a different tool or tools, substantially as set forth.

7. The combination of a motor, a supporting skirt therefor, said motor having an upright shaft depending centrally into said skirt, a ball bearing for said motor shaft having a race ring arranged in a cavity in said skirt, a spindle case having a detachable connection with said skirt, said skirt being split and provided with means for clamping said bearing race and said spindle case in place thereon, and a tool or tools mounted in said spindle case and driven by said motor shaft, substantially as set forth.

8. The combination of a motor, a tool driven thereby, and a guide roller having peripheral portions of different diameters, said guide roller being reversible with respect to said tool whereby one or another of its peripheral portions coöperates with a guide face to direct said tool, substantially as set forth.

9. The combination of a motor, a tool spindle and tool driven thereby, a bearing part for said spindle, and a guide roller for said tool which has portions of different diameters and is reversibly secured on said bearing part, substantially as set forth.

10. The combination of a motor, a skirt therefor which rests on a supporting surface and supports said motor, a tool or tools located within said skirt and driven by said motor, and a fan wheel located between said motor and said skirt for creating an air current downwardly and outwardly through said skirt, substantially as set forth.

11. The combination of a motor, a supporting skirt therefor, a tool or tools located within said skirt and driven by said motor, a fan wheel located between said skirt and said motor and driven by the latter, and a brake device movable to contact with the peripheral portion of said fan wheel to stop said motor, substantially as set forth.

12. The combination of a motor, a supporting skirt therefor, a tool or tools located within said skirt and driven by said motor, a wheel located between said skirt and said motor and driven by the latter, and a brake device mounted on said skirt and movable to contact with said wheel to stop said motor, substantially as set forth.

13. The combination of a motor having an upright shaft, bearings therefor, a spindle case detachably connected to said motor and having a cavity into which the lower end of said motor shaft depends, tools journaled in said spindle case, said motor shaft having a longitudinal oil chamber and passages leading therefrom to said shaft bearings, and said spindle case having passages leading from said cavity in the spindle case to said tool journals, whereby the oil collects in said cavity and is delivered therefrom to said tool journals, substantially as set forth.

14. The combination of two rotary cutters, means for driving the same, and guide rollers for said cutters each having peripheral portions of different diameters, said guide rollers being shiftable with respect to said cutters to place one or another of their peripheral portions so as to travel on coöperating guide faces to direct said cutters and regulate the width of the cut produced thereby, substantially as set forth.

Witness my hand, this 6th day of January, 1908.

GEORGE L. KELLEY.

Witnesses:
C. W. PARKER,
C. B. HORNBECK.